(12) United States Patent
Doyle et al.

(10) Patent No.: US 7,171,470 B2
(45) Date of Patent: Jan. 30, 2007

(54) GRID SERVICE SCHEDULING OF RELATED SERVICES USING HEURISTICS

(75) Inventors: Ronald P. Doyle, Raleigh, NC (US); David Louis Kaminsky, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 389 days.

(21) Appl. No.: 10/370,817

(22) Filed: Feb. 20, 2003

(65) Prior Publication Data
US 2004/0167980 A1 Aug. 26, 2004

(51) Int. Cl.
G06F 15/173 (2006.01)

(52) U.S. Cl. ...................... 709/225; 709/200

(58) Field of Classification Search ............... 709/218, 709/220, 223, 225, 226, 230, 224, 227, 200, 709/203, 204; 370/395; 707/10, 100, 200; 718/102, 105; 715/500, 853; 717/107; 700/181; 705/1, 17, 27; 726/19; 710/36; 711/150
See application file for complete search history.

(56) References Cited

U.S. PATENT DOCUMENTS

| 5,546,379 | A | 8/1996 | Thaweethai et al. .......... 370/17 |
| 5,631,693 | A | 5/1997 | Wunderlich et al. ........... 348/7 |
| 5,818,725 | A | 10/1998 | McNamara et al. ........ 364/483 |
| 5,943,480 | A | 8/1999 | Neidhardt .............. 395/200.56 |
| 6,086,618 | A | 7/2000 | Al-Hilali et al. ............... 703/2 |
| 6,092,178 | A | 7/2000 | Jindal et al. .................. 712/27 |
| 6,115,646 | A * | 9/2000 | Fiszman et al. ............ 700/181 |
| 6,182,225 | B1 * | 1/2001 | Hagiuda et al. .............. 726/19 |
| 6,185,184 | B1 | 2/2001 | Mattaway et al. .......... 370/230 |
| 6,199,068 | B1 * | 3/2001 | Carpenter ................... 707/100 |
| 6,208,345 | B1 * | 3/2001 | Sheard et al. ............... 715/853 |

(Continued)

FOREIGN PATENT DOCUMENTS

WO  WO 01/14987  3/2001

(Continued)

OTHER PUBLICATIONS

Grid Service Specification—Tuecke, Czajkowski, Foster, Frey., (2002) www.gridforum.org/ogsi-wg/drafts/GS_Spec_draft03_2002-07-17.pdf.*

(Continued)

*Primary Examiner*—Thong Vu
(74) *Attorney, Agent, or Firm*—Jeanine Ray-Yarletts, Esq.; Steven M. Greenberg, Esq.; Carey, Rodriguez, Greenberg & Paul, LLP

(57) ABSTRACT

A method and system for creating service instances in a computing grid. The method can include scheduling a service in the computing grid to process at least a portion of a requested transaction. At least one additional service related to the scheduled service can be identified, and a load condition can be assessed in the at least one additional service related to the scheduled service. A new instance of the at least one additional service can be created if the load condition exceeds a threshold load. In this way, an enhanced capacity for processing transactions can be established in the related services in advance of a predicted increase in load in the grid.

14 Claims, 2 Drawing Sheets

U.S. PATENT DOCUMENTS

| | | | |
|---|---|---|---|
| 6,222,530 B1* | 4/2001 | Sequeira | 715/500.1 |
| 6,247,056 B1 | 6/2001 | Chou et al. | 709/229 |
| 6,314,456 B1 | 11/2001 | Van Andel et al. | 709/218 |
| 6,336,138 B1* | 1/2002 | Caswell et al. | 709/223 |
| 6,360,172 B1 | 3/2002 | Burfeind et al. | |
| 6,363,410 B1 | 3/2002 | Kanamori et al. | 709/104 |
| 6,442,165 B1* | 8/2002 | Sitaraman et al. | 370/395.4 |
| 6,463,454 B1* | 10/2002 | Lumelsky et al. | 708/105 |
| 6,480,861 B1 | 11/2002 | Kanevsky et al. | 707/103 |
| 6,490,620 B1* | 12/2002 | Ditmer et al. | 709/224 |
| 6,594,662 B1* | 7/2003 | Sieffert et al. | 707/10 |
| 6,601,020 B1* | 7/2003 | Myers | 702/186 |
| 6,662,195 B1* | 12/2003 | Langseth et al. | 707/200 |
| 6,714,980 B1 | 3/2004 | Markson et al. | |
| 6,745,382 B1* | 6/2004 | Zothner | 717/107 |
| 6,751,657 B1* | 6/2004 | Zothner | 709/220 |
| 6,804,711 B1* | 10/2004 | Dugan et al. | 709/223 |
| 6,813,278 B1* | 11/2004 | Swartz et al. | 370/466 |
| 6,836,803 B1* | 12/2004 | Swartz et al. | 709/227 |
| 6,868,441 B2* | 3/2005 | Greene et al. | 709/220 |
| 6,917,963 B1* | 7/2005 | Hipp et al. | 709/204 |
| 2001/0005829 A1* | 6/2001 | Raveis, Jr. | 705/1 |
| 2002/0016828 A1 | 2/2002 | Daugherty et al. | 709/214 |
| 2002/0107743 A1* | 8/2002 | Sagawa | 705/17 |
| 2002/0116484 A1* | 8/2002 | Podracky | 709/223 |
| 2002/0165727 A1* | 11/2002 | Greene et al. | 705/1 |
| 2004/0010545 A1* | 1/2004 | Pandya | 709/203 |
| 2004/0122747 A1* | 6/2004 | Jimenez et al. | 705/27 |
| 2004/0123296 A1* | 6/2004 | Challenger et al. | 718/102 |
| 2004/0205206 A1* | 10/2004 | Naik et al. | 709/230 |
| 2005/0021594 A1* | 1/2005 | Bernardin et al. | 709/200 |

FOREIGN PATENT DOCUMENTS

WO     WO 02/063504     8/2002

OTHER PUBLICATIONS

The Physiology of the Grid: An Open Grid Services..—Foster, Kesselman.. (2002) www.gridforum.org/ogsi-wg/drafts/ogsa_draft2.9_2002-06-22.pdf.*

Multi-Agent Support for Internet-Scale Grid Management—Overeinder Wijngaards Van (2002) ftp.cs.vu.nl/pub/steen/papers/aigrid.02.ps.gz.*

Charging Control and Transaction Accounting..—Hwang.. (2002) web.syr.edu/~jshwang/pages/../resource/IRTL-ICQT02CR.pdf.*

A Fault Detection Service for Wide Area Distributed..—Stelling, Foster.. (1998) ☐☐ftp.globus.org/pub/globus/papers/hbm.ps.gz.*

The Data Grid: Towards an Architecture for the..—Chervenak.. (1999) ☐☐www.cs.virginia.edu/~humphrey/GridComputingClass/papers/JNCApaper.pdf.*

Grid as Production Computing Environments: The..—Johnston, Gannon.. (1999) ☐☐www.extreme.indiana.edu/~gannon/hpdc_ipg.pdf.*

GridRPC: A Remote Procedure Call API for Grid Computing—Seymour, Nakada.. (2002) ☐☐icl.cs.utk.edu/news_pub/submissions/grpc.ps.*

InfoGram: a grid service that supports both information queries and job execution☐☐von Laszewski, G.; Gawor, J.; Pena, C.J.; Foster, I.;High Performance Distributed Computing, 2002. IEEE International Symposium on Jul. 23-26, 2002 pp. 333-342.*

Compute Power Market: towards a market-oriented grid Buyya, R.; Vazhkudai, S.; Cluster Computing and the Grid, 2001. Proceedings. First IEEE/ACM International Symposium on May 15-18, 2001 pp. 574-581.*

Nimrod/G; an architecture for a resource management and scheduling system in a global computational grid Buyya, R.; Abramson, D.; Giddy, J.; High Performance Computing in the Asia-Pacific Region, 2000. Proceedings. The Fourth International Conference/Exhibition on vol. 1, May 14-17, 2000 pp. 283-289.*

The AppLeS Parameter Sweep Template: User-Level Middleware for the Grid Casanova, H.; Berman, F.; Obertelli, G.; Wolski, R.; Supercomputing, ACM/IEEE 2000 Conference Nov. 4-10, 2000 pp. 60-60.*

Datta, et al., *Accelerating Dynamic Web Content Generation*, pp. 27-36, Sep., Oct. (2002), *IEEE Internet Computing*, <http://computer.org/internet.html>.

Foster, et al., *An Open Grid Services Architecture*, OMG Web Services Workshop, pp. 1-18, (Mar. 7, 2002), <http://www.globus.org.html>.

Plale, et al., *Key Concepts and Services of a Grid Information Service*, pp. 1-9 (Feb. 3, 2002), *ISCA 15th International Parallel and Distributed Computing Systems (PDCS)*, (Sep. 2002), www.gridforum.org/Meetings/GGF4/Docs/res.pdf.

D. Taft, *IGM boisters grid computing line, eWEEK, New & Analysis*, p. 24, (Feb. 3, 2003).

The Physiology of the Grid: An Open Grid Services—Foster, Kesselman. (2002) www.gridforum.org/ogsi-wg/drafts/ogsa_draft2.9_2002-06-22.pdf.

The Data Grid: Towards an Architecture for the Distributed Management and Analysis of Large Scientific Datasets. Chervenak (1999) www.cs.virginia.edu/humphrey/GridComputingClass/papers/JNCApaper.pdf.

Heuristics for Scheduling Parameter Sweep—Casanova (2000) Apples.ucsd.edu/pubs/hew00_pst.ps.

* cited by examiner

GRID SERVICE SCHEDULING OF RELATED SERVICES USING HEURISTICS

BACKGROUND OF THE INVENTION

1. Statement of the Technical Field

The present invention relates to the field of distributed computing, including Web services and Grid services, and more particularly to the anticipatory creation of distributed service instances through the operation of a grid mechanism.

2. Description of the Related Art

Web services represent the leading edge of distributed computing and are viewed as the foundation for developing a truly universal model for supporting the rapid development of component-based applications over the World Wide Web. Web services are known in the art to include a stack of emerging standards that describe a service-oriented, component-based application architecture. Specifically, Web services are loosely coupled, reusable software components that semantically encapsulate discrete functionality and are distributed and programmatically accessible over standard Internet protocols.

Conceptually, Web services represent a model in which discrete tasks within processes are distributed widely throughout a value net. Notably, many industry experts consider the service-oriented Web services initiative to be the next evolutionary phase of the Internet. Typically, Web services can be defined by an interface such as the Web services definition language (WSDL), and can be implemented according to the interface, though the implementation details matter little so long as the implementation conforms to the Web services interface. Once a Web service has been implemented according to a corresponding interface, the implementation can be registered with a Web services registry, such as Universal Description, Discover and Integration (UDDI), as is well known in the art. Upon registration, the Web service can be accessed by a service requestor through the use of any supporting messaging protocol, including for example, the simple object access protocol (SOAP).

In a service-oriented application environment supporting Web services, locating reliable services and integrating those reliable services dynamically in realtime to meet the objectives of an application has proven problematic. While registries, directories and discovery protocols provide a base structure for implementing service detection and service-to-service interconnection logic, registries, directories, and discovery protocols alone are not suitable for distributed interoperability. Rather, a more structured, formalized mechanism can be necessary to facilitate the distribution of Web services in the formation of a unified application.

Notably, the physiology of a grid mechanism through the Open Grid Services Architecture (OGSA) can provide protocols both in discovery and also in binding of Web services, hereinafter referred to as "grid services", across distributed systems in a manner which would otherwise not be possible through the exclusive use of registries, directories and discovery protocols. As described both in Ian Foster, Carl Kesselman, and Steven Tuecke, *The Anatomy of the Grid*, Intl J. Supercomputer Applications (2001), and also in Ian Foster, Carl Kesselman, Jeffrey M. Nick and Steven Tuecke, *The Physiology of the Grid*, Globus.org (Jun. 22, 2002), a grid mechanism can provide distributed computing infrastructure through which grid services instances can be created, named and discovered by requesting clients.

Grid services extend mere Web services by providing enhanced resource sharing and scheduling support, support for long-lived state commonly required by sophisticated distributed applications, as well as support for inter-enterprise collaborations. Moreover, while Web services alone address discovery and invocation of persistent services, grid services support transient service instances which can be created and destroyed dynamically. Notable benefits of using grid services can include a reduced cost of ownership of information technology due to the more efficient utilization of computing resources, and an improvement in the ease of integrating various computing components. Thus, the grid mechanism, and in particular, a grid mechanism which conforms to the OGSA, can implement a service-oriented architecture through which a basis for distributed system integration can be provided-even across organizational domains.

In operation, grid services can be instantiated as need be to accommodate incoming requests to access specified grid services. Ordinarily, once access to a grid service has been requested, the grid mechanism can locate an asserted compatible implementation based upon which an instance of the grid service can be created to satisfy the access request. Alternatively, the access request can be satisfied by an already created instance of the asserted compatible implementation. As the capacity of the created instance becomes increasingly taxed so that the created instance no longer can adequately satisfy all access requests from all client requestors, the grid mechanism can create new instances of the grid service to satisfy the overflow of requests. Notably, as grid services instances are deemed unnecessary in view of a measured load, already created instances of the grid service can be unloaded as required.

Nevertheless, new instances of a requested, but overloaded grid service will not be created until the load experienced by the already created instances of the requested grid service reach inappropriate levels. Furthermore, as individual grid services can form and usually do form merely a portion of an application, related grid services can become overloaded in step with the overloading experienced by the individual grid services. Yet, new instances of the related grid services are not created until a separate and independent analysis concludes that new instances of the related grid services will be required. Accordingly, valuable computing resources can be consumed needlessly in determining when to create new instances of grid services to accommodate an increase in load. Furthermore, in many cases more grid services instances than necessary can be created in a knee-jerk response to increased load.

SUMMARY OF THE INVENTION

The present invention is a method and system for creating service instances in a computing grid. The method can include scheduling a service in the computing grid to process at least a portion of a requested transaction. At least one additional service related to the scheduled service can be identified, and a load condition can be assessed in the at least one additional service related to the scheduled service. A new instance of the at least one additional service can be created if the load condition exceeds a threshold load. In this way, an enhanced capacity for processing transactions can be established in the related services in advance of a predicted increase in load in the grid.

In one aspect of the invention, the scheduling step can include locating a service instance in the computing grid which has been created from a service configured to access resources required to satisfy at least a portion of the requested transaction. A load condition can be assessed in the located service instance. Subsequently, a new instance of the configured service can be created if the load condition in the located service instance exceeds a threshold load. Otherwise, the portion of the requested transaction can be assigned to the located service instance where the load condition does not exceed a threshold load. In this regard, the creating step can include the step of creating a new instance of the at least one additional service if the load condition exceeds a threshold load specified according to the terms of a service level agreement (SLA).

In another aspect of the invention, the identifying step can include monitoring individual resources accessed by different types of transactions processed by different services in the computing grid. Additionally, the different services can be queried to determine underlying resource capabilities of the different services. Finally, selected ones of the different services can be identified as the related services where individual ones of the resources accessed by the selected ones of the different services, and the underlying resource capabilities are pre-determined by way of transaction type to relate to transactions processed in the scheduled service.

A predictive grid service instance creation system can include a service creation factory disposed in a grid services host and configured to instantiate grid services on demand in a corresponding computing grid. The system also can include a monitor programmed to monitor transactions scheduled in the computing grid to identify related grid services, and to assess contemporaneous load conditions in individual instantiated ones of grid services in the computing grid. Finally, the system can include a scheduler coupled both to the service creation factory and to the monitor.

Notably, the scheduler can schedule received transaction requests to be processed by selected instantiated ones of the grid services in the computing grid where load conditions in the instantiated ones permit. The scheduler further can request that the service creation factory create new instances of the grid services where load conditions in the instantiated ones require. Finally, the scheduler yet further can request that the service creation factory create new instances of related grid services identified by the monitor where load conditions in the related grid services require.

In one important aspect of the present invention, at least one SLA further can be included which can specify at least one of availability and responsiveness terms based upon which it can be determined when load conditions permit scheduling of a specified grid service, and when load conditions require creating a new instance of a specified grid service. In another important aspect of the invention, a data store of transaction metrics can be provided in which the metrics are collected by the monitor for use in identifying the related grid services. To that end, the transaction metrics can include resources used by types of transactions processed by the grid services, and resource capabilities specified by the grid services in accessing the resources.

BRIEF DESCRIPTION OF THE DRAWINGS

There are shown in the drawings embodiments which are presently preferred, it being understood, however, that the invention is not limited to the precise arrangements and instrumentalities shown, wherein.

DETAILED DESCRIPTION OF THE PREFERRED EMBODIMENTS

The present invention is a method and system for creating instances of Web services within a computing grid based upon heuristics to predict service demand. In accordance with the inventive arrangements, relationships between different Web services in the grid can be determined. Based upon the determination, the instantiation of one Web service can cause the pre-emptive instantiation of other, related Web services so as to predict an imminent need to create additional service instances of the related Web services to satisfy an impending load. Notably, the anticipatory load threshold for creating instances of related services can be based upon the terms of a service level agreement (SLA).

Figure 1:
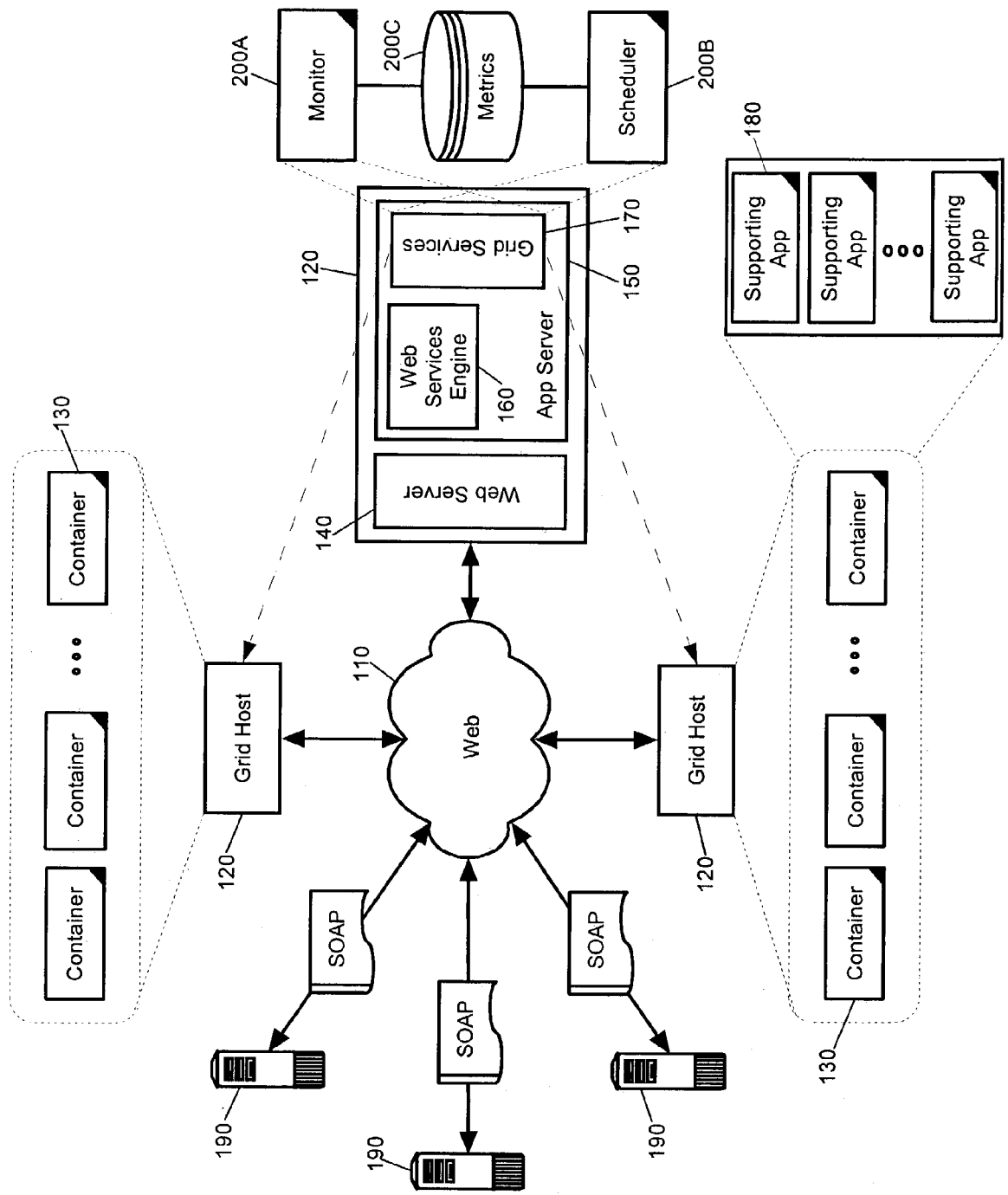
FIG. 1 is a block illustration of a Web services grid having a predictive system for creating Web service instances in the Web services grid in accordance with the present invention; and, FIG. 2 is a flow chart illustrating a process for predictively creating instances of Web services in the Web services grid of FIG. 1.

FIG. 1 is a block illustration of a Web services grid having a predictive system for creating Web service instances in the Web services grid in accordance with the present invention. As will be apparent to the skilled artisan, the Web services grid can be configured with one or more grid hosts 120 communicatively linked to one another in a grid fashion across a computer communications network 110, for instance the Internet. Individual requesting clients 190 can request access to Web services from one or more of the grid hosts 120. Specifically, as is well-known in the art, SOAP encoded messages can be exchanged between requesting clients 190 and the grid hosts 120. The messages can include requests to discover the location of particular Web services and well as responses to the requests in which the network location of the requested Web services are revealed.

The grid hosts 120 can be disposed within a server computing device in a centralized fashion, or across multiple server computing devices in a distributed fashion. In either case, a Web server 140 can be provided which can be configured to respond to network requests for content, such as markup documents. As will be understood by one of ordinary skill in the art, the Web server 140 can be configured to handle hypertext transfer protocol (HTTP) messages and to distribute markup such as hypertext markup language (HTML) formatted documents, extensible markup language (XML) formatted documents, and the like.

The Web server 140 can be communicatively linked in the grid host 120 to an application server 150. Application servers are well-known in the art and typically are configured to process machine code, whether in an interpreted manner, or in a native format. Conventional application servers process server-side logic such as scripts and servlets. In any event, the application server 150 can be linked to a Web services engine 160 configured to instantiate individual Web services in one or more Web services containers 130. Importantly, each Web services container 130 can access one or more supporting applications 180, such as a markup parser or a markup transcoder. As a result, Web services operating within a container 130 can access the operational functionality of the supporting applications 180.

Importantly, a grid service mechanism 170 can be disposed in each grid host 120. The grid service mechanism 170 can implement a grid services interface such as that defined by OGSA and specified, for example, according to the Globus Project, *Globus Toolkit Futures: An Open Grid Services Architecture*, Globus Tutorial, Argonne National Laboratory (Jan. 29, 2002). As is well-known in the art, an OGSA compliant grid services interface can include the following interfaces and behaviors:
1. Web service creation (Factory)
2. Global naming (Grid Service Handle) and references (Grid Service Reference)
3. Lifetime management
4. Registration and discovery
5. Authorization
6. Notification
7. Concurrency
8. Manageability In that regard, the grid services mechanism 170 can include a factory interface able to clone instances of selected Web services into new or pre-existing application containers using a "Factory Create Service".

Significantly, the grid services mechanism 170 can instantiate clone instances of a requested Web service across one or more remote grid hosts 120. In particular, consistent with the intent of grid architectures, where processing loads experienced by individual remote grid hosts 120 exceed acceptable or pre-specified capacities, others of the individual remote grid hosts 120 can be selected to host new instances of selected Web services. Unlike a conventional grid services mechanism, the grid services mechanism 170 also can predictively create instances not only of required Web services, but also, the grid services mechanism 170 can create instances of related Web services to accommodate an anticipated load.

More specifically, a monitoring process 200A can monitor resources utilized by different application transaction types. A transaction, for purposes of the present invention, can include any process performed by an application hosted in the grid. Exemplary transactions can include an inquiry operation in a management information system, or a debit operation in a financial processing system. The set of resources utilized by the application transaction types can be written to fixed storage 200C for later use in predictively and heuristically determining whether to create new instances of a Web service and related Web services.

In addition to utilized resources, the monitoring process 200A can query Web services in the grid to identify their respective underlying resource capabilities. In particular, the monitoring process 200A can determine what types of resources can be accessed by the respective Web services, and at what level those resources can be accessed by the respective Web services. Finally, the monitoring process 200A can query Web services in the grid to determine an experienced load. In each of the foregoing cases, though, it will be recognized by the skilled artisan that the invention is not so limited to a proactive querying. Rather, in the case of a subscription or observer model, the Web services in the grid can proactively report the underlying resource capabilities and load to the monitoring process 200A. In each case, however, the collected metrics can be stored in fixed storage 200C.

Subsequent to the monitoring process 200A, a scheduler 200B can receive a request for a transaction, responsive to which the scheduler 200B can retrieve the metrics stored in fixed storage 200B. The scheduler 200B subsequently can heuristically apply the retrieved metrics to determine the manner of scheduling the received transaction. More specifically, the scheduler 200B can identify specific Web services in particular containers 130 within particular grid hosts 120 to satisfy portions of the requested transaction. Where required, additional Web service instances can be created to satisfy portions of the requested transaction. Finally, related Web service instances can be created not necessarily to satisfy a contemporaneous load experienced by already created Web service instances in the grid, but to satisfy an anticipated load predicted heuristically according to the metrics stored in fixed storage 200C.

Figure 2:
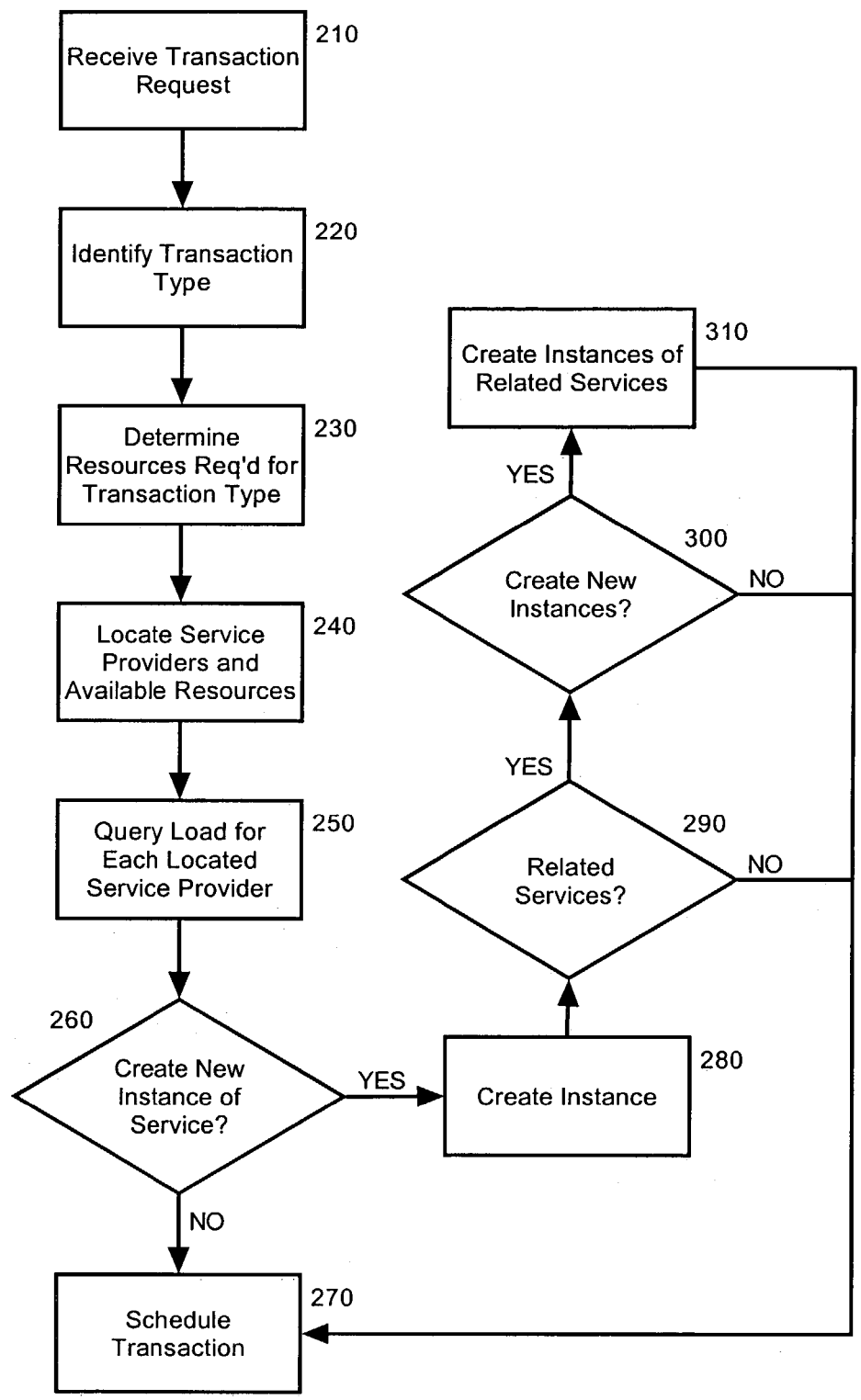

FIG. 2 is a flow chart illustrating a process for predictively scheduling instances of Web services in the Web services grid of FIG. 1. Beginning in block 210, a transaction request can be received. In block 220, the transaction type can be identified. In block 230, the resources required to service the transaction can be determined based upon the identified transaction type. In block 240, known service providers in the grid can be located which have been configured to access the required resources.

In block 250, each located service provider can be queried to determine the contemporaneously experienced load. In decision block 260, if a new service instance must be created to access one or more of the resources required by the requested transaction, in block 280 an instance of the service can be created in a grid host in the grid. As it will be apparent to one skilled in the art, new service instances can be created for each service able to access the required resource, but whose load exceeds a threshold load above which the service cannot adequately provide access to the required resource. Notwithstanding, if new service instances will not be required to access the required resources, in block 270, the transaction can be scheduled according to existing instances of the located services.

In decision block 290, additional services which are known to be related to the created service instance can be identified based upon previously gathered metrics. In decision block 300, the load for each identified related services can be tested to determine whether a new instance of the related service should be created to satisfy an anticipated, impending request. Finally, in block 310, where appropriate, instances of selected related services can be created as the load determination requires, subsequent to which in block 270 the received transaction can be scheduled.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for creating service instances in a computing grid, the method comprising the steps of:

scheduling a service in the computing grid to process at least a portion of a requested transaction;

identifying at least one additional service related to said scheduled service;

assessing a load condition in said at least one additional service related to said scheduled service; and, creating a new instance of said at least one additional service if said load condition exceeds a threshold load.

2. The method of claim 1, wherein said scheduling step comprises the steps of:

locating a service instance in the computing grid which has been created from a service configured to access resources required to satisfy at least a portion of said requested transaction;

assessing a load condition in said located service instance; and, creating a new instance of said configured service if said load condition in said located service instance exceeds a threshold load, but assigning said portion of said requested transaction to said located service instance if said load condition does not exceed a threshold load.

3. The method of claim 2, wherein said step of creating a new instance of said configured service comprises the step of creating a new instance of said configured service if said load condition in said located service instance exceeds a threshold load specified according to the terms of a service level agreement (SLA), but assigning said portion of said requested transaction to said located service instance if said load condition does not exceed said threshold load.

4. The method of claim 1, wherein said identifying step comprises the steps of:

monitoring individual resources accessed by different types of transactions processed by different services in the computing grid;

querying said different services to determine underlying resource capabilities of said different services; and, identifying selected ones of said different services as said related services where individual ones of said resources accessed by said selected ones of said different services, and said underlying resource capabilities are pre-determined by way of transaction type to relate to transactions processed in said scheduled service.

5. The method of claim 1, wherein said creating step comprises the step of creating a new instance of said at least one additional service if said load condition exceeds a threshold load specified according to the terms of a service level agreement (SLA).

6. A predictive grid service instance creation system comprising:

a service creation factory disposed in a grid services host and configured to instantiate grid services on demand in a corresponding computing grid;

a monitor programmed to monitor transactions scheduled in said computing grid to identify related grid services, and to assess contemporaneous load conditions in individual instantiated ones of grid services in said computing grid; and, a scheduler coupled both to said service creation factory and to said monitor, said scheduler (1) scheduling received transaction requests to be processed by selected instantiated ones of said grid services in the computing grid where load conditions in said instantiated ones permit, (2) requesting that said service creation factory create new instances of said grid services where load conditions in said instantiated ones require, and (3) requesting that said service creation factory create new instances of related grid services identified by said monitor where load conditions in said related grid services require.

7. The system of claim 6, further comprising at least one service level agreement (SLA) having at least one of availability and responsiveness terms based upon which it can be determined when load conditions permit scheduling of a specified grid service, and when load conditions require creating a new instance of a specified grid service.

8. The system of claim 6, further comprising a data store of transaction metrics collected by said monitor for use in identifying said related grid services.

9. The system of claim 8, wherein said transaction metrics comprise resources used by types of transactions processed by said grid services, and resource capabilities specified by said grid services in accessing said resources.

10. A machine readable storage having stored thereon a computer program for creating service instances in a computing grid, the computer program comprising a routine set of instructions for causing the machine to perform the steps of:

scheduling a service in the computing grid to process at least a portion of a requested transaction;

identifying at least one additional service related to said scheduled service;

assessing a load condition in said at least one additional service related to said scheduled service; and, creating a new instance of said at least one additional service if said load condition exceeds a threshold load.

11. The machine readable storage of claim 10, wherein said scheduling step comprises the steps of:

locating a service instance in the computing grid which has been created from a service configured to access resources required to satisfy at least a portion of said requested transaction;

assessing a load condition in said located service instance; and, creating a new instance of said configured service if said load condition in said located service instance exceeds a threshold load, but assigning said portion of said requested transaction to said located service instance if said load condition does not exceed a threshold load.

12. The machine readable storage of claim 11, wherein said step of creating a new instance of said configured service comprises the step of creating a new instance of said configured service if said load condition in said located service instance exceeds a threshold load specified according to the terms of a service level agreement (SLA), but assigning said portion of said requested transaction to said located service instance if said load condition does not exceed said threshold load.

13. The machine readable storage of claim 10, wherein said identifying step comprises the steps of:

monitoring individual resources accessed by different types of transactions processed by different services in the computing grid;

querying said different services to determine underlying resource capabilities of said different services; and, identifying selected ones of said different services as said related services where individual ones of said resources accessed by said selected ones of said different services, and said underlying resource capabilities are pre-determined by way of transaction type to relate to transactions processed in said scheduled service.

14. The machine readable storage of claim 10, wherein said creating step comprises the step of creating a new instance of said at least one additional service if said load condition exceeds a threshold load specified according to the terms of a service level agreement (SLA).

* * * * *